United States Patent
Kishi (10) Patent No.: US 7,602,836 B2
(45) Date of Patent: Oct. 13, 2009

(54) RECEIVER

(75) Inventor: Takahiko Kishi, Yokohama (JP)

(73) Assignee: Samsung Electronics Co., Ltd (KR)

( * ) Notice: Subject to any disclaimer, the term of this patent is extended or adjusted under 35 U.S.C. 154(b) by 806 days.

(21) Appl. No.: 11/000,614

(22) Filed: Dec. 1, 2004

(65) Prior Publication Data

US 2005/0117630 A1 Jun. 2, 2005

(30) Foreign Application Priority Data

Dec. 1, 2003 (JP) ............................. 2003-401492
Oct. 7, 2004 (KR) ...................... 10-2004-0079989

(51) Int. Cl.
*H04B 1/707* (2006.01)
(52) U.S. Cl. .................................... 375/148
(58) Field of Classification Search ................. 375/144, 375/147, 148, 225, 227, 260, 340, 346, 348; 455/67.11, 67.13, 67.16, 68, 71, 226.1, 226.2, 455/226.3, 343.2, 343.3
See application file for complete search history.

(56) References Cited

U.S. PATENT DOCUMENTS

| 5,577,087 | A  | * | 11/1996 | Furuya         | 375/377 |
|-----------|----|---|---------|----------------|---------|
| 6,947,490 | B1 | * | 9/2005  | Edwards et al. | 375/261 |
| 7,031,373 | B1 | * | 4/2006  | Iyer           | 375/148 |
| 2004/0081260 | A1 | * | 4/2004 | Matsusaka     | 375/340 |

FOREIGN PATENT DOCUMENTS

| JP | 06-164661 | 6/1994 |
|----|-----------|--------|
| JP | 07-023072 | 1/1995 |
| JP | 08-023232 | 1/1996 |
| JP | 09-200286 | 7/1999 |
| JP | 11-203294 | 7/1999 |
| JP | 11-261523 | 9/1999 |
| JP | 2000-252896 | 9/2000 |
| JP | 2001-008135 | 1/2001 |
| JP | 2001-016286 | 1/2001 |
| JP | 2002-033780 | 1/2002 |
| JP | 2002-208869 | 7/2002 |
| JP | 2003-134225 | 5/2003 |
| JP | 2003-263849 | 9/2003 |
| JP | 2003-334194 | 11/2003 |

* cited by examiner

*Primary Examiner*—Young T. Tse
(74) *Attorney, Agent, or Firm*—The Farrell Law Firm, LLP (57) ABSTRACT

Disclosed is a receiver for achieving optimum power consumption and optimum reception performance according to use, purpose, and required performance. A control circuit calculates an evaluation value H relating to a detection method and a reception state of a received signal. When a delay detection is selected depending on the evaluation value H, a delay detection circuit and a judgment circuit operate, and a selection circuit selects and outputs an output signal of the judgment circuit. When a semi-synchronous detection is selected depending on the evaluation value H, the semi-synchronous detection circuit, the signal judgment unit and the differential decoder operate, and the selection circuit selects and outputs an output signal of the differential decoder. When a dynamic controlled detection is selected depending on the evaluation value H, the delay detection and the semi-synchronous detection are controlled to be dynamically changed.

14 Claims, 3 Drawing Sheets

RECEIVER

PRIORITY

This application claims priority to an application entitled "Receiver" filed in the Japan Patent Office on Dec. 1, 2003 and assigned Serial No. 401492/2003, and filed in the Korean Intellectual Property Office on Oct. 7, 2004 and assigned Serial No. 2004-79989, the contents of both of which are incorporated herein by reference.

BACKGROUND OF THE INVENTION

1. Field of the Invention

The present invention relates to a receiver, and more particularly to a receiver capable of demodulating a received signal with optimum power consumption and optimum reception performance.

2. Description of the Related Art

Development of a received-signal processing method capable of providing maximum reception performance with minimum power consumption has been lagging. Conventional receivers typically use a delay detection scheme or a synchronous detection scheme for the purpose of processing a received signal when a n/4-shift QPSK (Quadrature Phase Shift Keying) signal or a QAM (Quadrature Amplitude Modulation) signal is received. The difference between the two detection schemes is shown in Table 1.

TABLE 1

| Detection Scheme | Characteristics | Experienced Problems |
|---|---|---|
| Delay Detection | Simple circuit construction Small power consumption | Performance when the received signal has a large delay dispersion is lower than when synchronous detection is utilized. |
| Synchronous detection | Complicated circuit construction Large power consumption | Poor reception performance wherein it is difficult to maintain synchronization (e.g., when the S/N rate of a received signal is low or when paging is large) |

That is, receivers using the delay detection scheme and the synchronous detection scheme have the problems described in Table 1. Receivers which select a detection scheme according to reception states of received signals have been proposed to solve the aforementioned problems as described in Table 2 (e.g., Japanese Laid-Open Patent Publication Nos. P08-23232 ("The 233 and 072 Documents") and P07-23072 and Japanese Patent Registration Publication No. 2977396 ("The 396 Document")).

TABLE 2

| Prior art | Characteristics | Problem |
|---|---|---|
| The 396 Document | On the basis of the amount of intersymbol interference or an error in signal judgment, conversion is performed to use one detection scheme having a better characteristic and to operate any one of two-side circuits, thereby achieving a low power consumption rate. | To obtain superior reception performance to that required by the user, more power than is necessary may be consumed. |
| The 232 and 072 Documents | On the basis of the level of a received signal, Conversion is performed to use one detection scheme having a better characteristic. | Same as above |

In addition, receivers for a CDMA (Code Division Multiple Access) signal or a spread spectrum signal have been proposed. Such receivers (i.e., RAKE receivers each of which contains a plurality of fingers) changes the number of fingers which operate according to reception states of received signals, thereby achieving low power consumption (e.g., Japanese Laid-Open Patent Publication Nos. P11-261523 and 2000-252896 ("the 523 and 896 Documents").

Although the aforesaid receivers (i.e., those receivers as described in the '232, '072, '396, 523, and '896 documents, and the like) would benefit users if the above-mentioned receivers provide increased reception performance, they also suffer from increased power consumption. To be specific, in the case of the receivers described in the 232 and 072 documents, since two circuit sections corresponding to the two detection schemes simultaneously operate, the amount of power consumption must greatly increase in order to obtain the best reception performance. In this case, the receivers can be used without any problem if a user wants stable processing of a received signal through the best reception performance, but shortening the lifetime of a battery (e.g., battery duration) by simultaneously operating the two circuit sections corresponding to the two detection schemes, is highly undesirable.

Meanwhile, the 396 document, in which power consumption is considered, discloses a technique for continuously monitoring the reception state of a received signal by the amount of intersymbol interference or by an error in signal judgment for the purpose of determining one of a delay detection circuit and a sub-synchronous detection circuit to be used.

However, in the case of the technique, when a user does not want the stable processing of a received signal through the best reception performance but wants to extend battery lifetime (i.e., increase the duration of the battery between charges), the operation of monitoring a reception state of a received signal is unnecessary, so that unnecessary power consumption caused by the unnecessary monitoring operation is against the benefit of the user.

Also, according techniques disclosed in the 523 and 896 documents, a RAKE receiver containing a plurality of fingers changes the number of fingers to operate according to reception states of received signals, thereby achieving low power consumption. However, in a RAKE receiver according to this technique, when more fingers operate than those necessary for the reception quality required by a user, unnecessary power is consumed and is undesirable.

SUMMARY OF THE INVENTION

Accordingly, the present invention has been made to solve the above-mentioned problems occurring in the prior art, and an object of the present invention is to provide a receiver for achieving optimum reception performance with optimum power consumption according to the performance required by a user and the purpose of the user.

To accomplish this object, in accordance with one aspect of the present invention, there is provided a receiver for demodulating a received signal, the receiver including a signal processing unit for processing a received signal by one of multiple processing schemes, an evaluation value calculation unit for calculating an evaluation value according to a user's communication purpose; and a judgment unit for selecting one processing scheme to be used in the signal processing unit depending to the calculated evaluation value.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of a receiver according to the present invention will be described with reference to the accompanying drawings. In the following description of the present invention, a detailed description of known functions and configurations incorporated herein will be omitted when it may obscure the subject matter of the present invention.

First, the operation of a receiver according to a first embodiment of the present will be described. To this end, the construction of the receiver according to the first embodiment of the present invention will be described with reference to FIG. 1, which is a block diagram illustrating the construction of the receiver according to the present invention. It is preferred that differential coding is performed with respect to a signal input to the receiver in order to execute delay detection according to the first embodiment of the present invention. Also, it is assumed that a training signal period of a signal length of Nr is typically endowed to a received signal.

Figure 1:
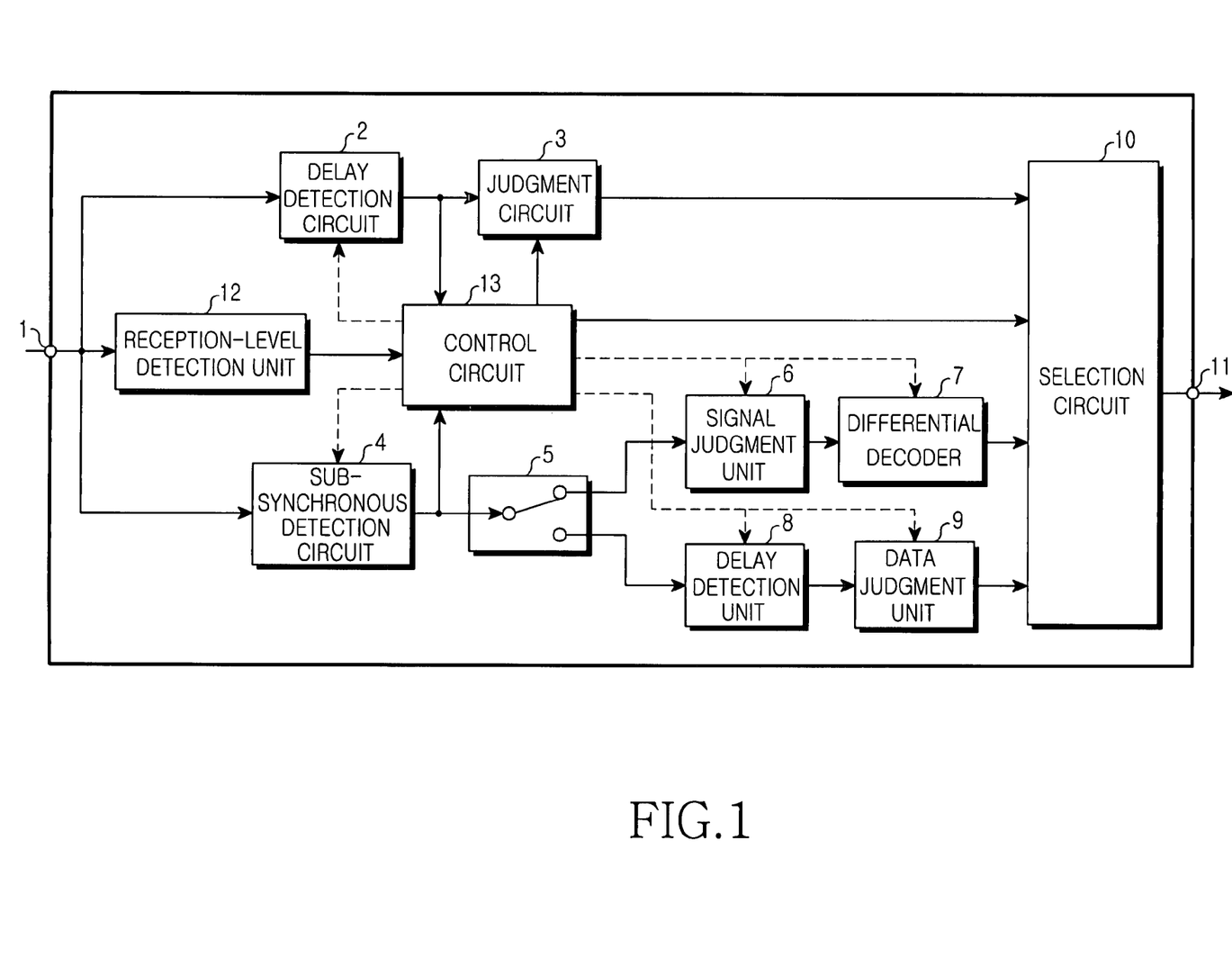
FIG. 1 is a block diagram illustrating the construction of the receiver according to a first embodiment of the present invention.

Referring to FIG. 1, the receiver includes a delay detection circuit 2 for delay-detecting a received signal of an RF frequency or an IF frequency input through an input terminal 1. An output terminal of the delay detection circuit 2 is connected to a judgment circuit 3, for judging a signal output from the delay detection circuit 2. Also, the receiver includes a sub-synchronous detection circuit 4 for performing sub-synchronous detection for the received signal of an RF frequency or an IF frequency input through an input terminal 1. An output terminal of the sub-synchronous detection circuit is connected through a switcher 5 to both a first group and a second group connected in parallel with each other, in which the first group includes a signal judgment unit 6 and a differential decoder 7 connected in series to each other and the second group includes a delay detection unit 8 and a data judgment unit 9 connected in series to each other.

Herein, the signal judgment unit 6 performs signal judgment for a signal output from the sub-synchronous detection circuit 4. An input signal having undergone the differential encoding in order to perform delay detection is decoded by the differential decoder 7 connected to an output terminal of the signal judgment unit 6.

The delay detection unit 8 performs delay detection for a baseband signal output from the sub-synchronous detection circuit 4. The data judgment unit 9, which operates the same as the judgment circuit 3, performs signal judgment for a signal having undergone delay detection (i.e., decoding of a differentially-encoded signal) by the delay detection unit 8.

Output terminals of the judgment circuit 3, the differential decoder 7, and the data judgment unit 9 are connected to a selection circuit 10. The selection circuit 10 selects one of signals output from the judgment circuit 3, the differential decoder 7, and the data judgment unit 9, and outputs the selected signal through an output terminal 11 as an output signal of the receiver according to the present embodiment.

In addition, the receiver according to this embodiment includes a reception-level detection unit 12 for measuring the level (i.e., a reception level R) of a received signal of an RF frequency or an IF frequency which is input to the receiver.

The receiver of the present embodiment also includes a control circuit 13 for selecting the optimum detection circuit according to the communication purpose of a user. The control circuit 13 reads a reception level output from the reception-level detection unit 12 and calculates an estimation value H according to a communication purpose, a reception state of a received signal and a detection scheme. In addition, the control circuit 13 reads outputs of the delay detection circuit 2 and the sub-synchronous detection circuit 4, calculates the amount of intersymbol interference or an error in signal judgment for estimating reception states of the respective detection circuits, and then controls the selection circuit 10 and the switcher 5 according to the calculated estimation value H, the calculated amount of intersymbol interference, or the calculated error in signal judgment. By such a construction, it is possible to select the optimum detection circuit according to the communication purpose of a user and the reception state of a received signal.

Therefore, by controlling the selection circuit 10 and the switcher 5, the receiver of the present embodiment can process a received signal of an RF frequency or an IF frequency using any of a first scheme of performing normal delay detection through the delay detection circuit 2 and the judgment circuit 3, a second scheme of performing sub-synchronous detection through the sub-synchronous detection circuit 4, the signal judgment unit 6, and the differential decoder 7, and a third scheme of performing delay detection through the delay detection unit 8 and the data judgment unit 9 after converting the received signal into a baseband signal through the sub-synchronous detection circuit 4, as desired.

The delay detection circuit 2, the judgment circuit 3, the sub-synchronous detection circuit 4, the signal judgment unit 6, the differential decoder 7, the delay detection unit 8, the data judgment unit 9, and the reception-level detection unit 12, which are included in the receiver of the preset embodiment, may be realized in an analog signal processing scheme of processing analog values of a received signal without any conversion, or may be realized in a digital signal processing scheme of processing a received signal after quantizing the received signal.

Hereinafter, the control operation of the control circuit 13 for selecting the optimum detection circuit will be described in detail. To this end, the control operation of selecting the optimum detection circuit in the control circuit 13 of the receiver according to the present embodiment will be described with reference to FIG. 2, which is a flowchart illustrating the control operation of the control circuit 13 in the receiver according to the first embodiment of the present invention.

First, the control operation for selecting the optimum detection circuit corresponding to the communication purpose of a user will be described with reference to the flowchart shown in FIG. 2.

The control circuit 13 in the receiver according to the present embodiment determines whether it is necessary to consider the reception state of a received signal in selecting the optimum detection circuit according to the communication purpose of a user in step S1. That is, it is determined whether a function for considering the reception state of a received signal is preset by the user. The received signal is preset by level R of the received signal as shown in Table 3 below.

As a result of the determination, it is determined that the function for considering the reception state of a received signal is preset, the control circuit 13 acquires a reception level R of the received signal from the reception-level detection unit 12 in step S2. In step S3, the control circuit 13 calculates an evaluation value H relating to a communication purpose, a reception state of a received signal and a detection scheme on the basis of a prestored control table.

In contrast, it is determined in step S1 that a function for not considering the reception state of a received signal is preset, the control circuit 13 set the reception level R of the received signal to be zero in step S4 and then proceeds to step S3 of calculating an evaluation value 'H' relating to a communication purpose, a reception state of a received signal and a detection scheme on the basis of a prestored control table.

The control table stored in the control circuit 13, which is in order to calculate an evaluation value H relating to a communication purpose, a reception state of a received signal and a detection scheme will now be described. Table 3 illustrates a fixed profile set according to the respective combinations of user's communication purposes and detection schemes, wherein the setting of the fixed profile is divided into two cases on the basis of the reception level R of a received signal and a reception-level threshold value Rth to be compared with the reception level, one of which is a case of "reception level R<reception-level threshold value Rth" and the other of which is a case of "reception level R≧reception-level threshold value Rth". In Table 3, a larger number indicates that a higher reception quality is required.

TABLE 3

| Communication purpose (application) | Level R of Received signal | Detection scheme | | |
|---|---|---|---|---|
| | | Delay detection | Sub-synchronous detection | Dynamic controlled detection |
| Voice (Self-system) | R < Rth | 2 | 0 | 0 |
| | R ≧ Rth | 0 | 2 | 0 |
| Text mail | | | | |
| VoIP | R < Rth | 0 | 0 | 1 |
| Unspecified | R ≧ Rth | 0 | 2 | 1 |
| Moving picture | R < Rth | 2 | 0 | 0 |
| | R ≧ Rth | 0 | 1 | 2 |

In Table 3, Dynamic controlled detection indicates that the control circuit 13 dynamically controls the change of detection circuits according to evaluation values representing the qualities of received signals which are calculated continuously while receiving signals. The dynamic control will be described in detail later.

Also, communication purposes of users may be classified into a first application type (e.g., a normal voice using a self-system codec for a cellular, an electronic mail using text information, etc.) requiring relatively lower reception quality, a second application type (e.g., a voice using VoIP (Voice over IP), etc.) requiring relatively higher reception quality, and a third application type (e.g., a moving picture, etc.) requiring a the highest reception quality, according to the types of applications. When the communication purpose of a user is not specified, it is recommended that the second application type requiring relatively higher reception quality should be used so as to not be influenced in communication (e.g., when a user's purpose is not certain the best method is selected).

Table 4 shows user request profile correction values (e.g., the user demand profile correction value) which are set in consideration of the condition of the user request conditions (e.g., user demand). Combinations of communication purposes of users and detection schemes in order to compensate for the fixed profile which is set for every combination of communication purposes of a user and detection method. To be specific, "extension of battery lifetime" and "improvement of reception quality" values are examples of user request conditions in Table 4. In the following description, tables and drawings, the "extension of battery lifetime" and "improvement of reception quality" will be abbreviated using "battery lifetime" and "reception quality", respectively. In Table 4, a larger number indicates a higher priority in the user's request.

Referring to Table 4, in the case of an application (e.g., a normal voice, an electronic mail using text information, etc.) requiring relatively lower reception quality, the delay detection has the advantage of the battery lifetime, so the user request profile correction value regarding the delay scheme is assigned as 2. Also, a dynamic controlled detection has the disadvantage of decreased battery life, so the user request profile correction value about the dynamic controlled detection is assigned as −2. Also, in the case of such an application, since the application itself does not require a high quality, any detection scheme does not have a gain on reception quality, so the user request profile correction values about all detection schemes are determined to be 0, for example, if a table value is 0, there is no change in a fixed profile.

TABLE 4

| Communication purpose (application) | Condition requested by user | Detection scheme | | |
|---|---|---|---|---|
| | | Delay detection | Sub-synchronous detection | Dynamic controlled detection |
| Voice (Self-system) | battery lifetime | 2 | 0 | −2 |
| Text mail | reception quality | 0 | 0 | 0 |
| VoIP Unspecified | battery lifetime | 2 | 0 | −2 |
| | reception quality | 0 | 1 | 2 |
| Moving picture | battery lifetime | 2 | 0 | 0 |
| | reception quality | −1 | 0 | 2 |

Meanwhile, Table 5 shows user setup request scale factors determined according to user's preference with respect to the user request profile correction values set as shown in Table. 4. As shown in Table. 5, a user can selectively determine user setup request scale factors, for example, using values from 0 to 5, with respect to the respective user request profile correction values according to the individual user's communication purposes and request conditions.

Referring to Table. 5, in the application (e.g., a normal voice application, an electronic mail application using text information, etc.) requiring relatively lower reception quality than, for example a VoIP application, the battery lifetime must take precedence over the reception quality, so the user setup request scale factor of the battery lifetime is assigned as 4 by a user.

TABLE 5

| Communication purpose (application) | Condition requested by user | User setup request scale factor |
|---|---|---|
| Voice (Self-system) | battery lifetime | 4 |
| Text mail | reception quality | 0 |
| VoIP | battery lifetime | 2 |
| Unspecified | reception quality | 4 |
| Moving picture | battery lifetime | 0 |
| | reception quality | 5 |

Meanwhile, estimation values H (which relate to a communication purpose, a reception state of a received signal and a detection scheme) as many combinations of communication purposes, reception states of received signals and detection schemes are obtained through Equation 1, on the basis of control tables pre-stored in the control circuit 13 as shown in Tables 3 to 5.

$$H = P + \sum_{n=1}^{J} Q(n) \times R(n) \qquad \text{Equation 1}$$

wherein, 'P' represents a fixed profile, Q(n) represents user request profile correction values set by n kinds of profiles ('n' is a positive integer), R(n) represents a user setup request scale factor corresponding to user request profile correction values of 'n' kinds, and 'J' represents the total number of the user request profile correction values.

According to the first embodiment of the present invention, since there are two kinds of user request profile correction values with respect to the battery lifetime (n=1) and the reception quality (n=2), the total number J of user request profile correction values becomes 2. For instance, in the case of an application (e.g., a normal voice, an electronic mail using text information, etc.) requiring relatively lower reception quality, when a reception level R is smaller than the reception-level threshold value Rth, a fixed profile is P=2, user request profiles are Q(1)=2 and Q(2)=0, user setup request scale factors are R(1)=4 and R(2)=0, so that a final estimation value H of the delay detection is calculated as shown in Equation 2.

$$\begin{aligned} H &= P + \sum_{n=1}^{2} Q(n) \times R(n) \\ &= 2 + 2 \times 4 + 0 \times 0 \\ &= 10 \end{aligned} \qquad \text{Equation 2}$$

Meanwhile, when the control circuit 13 can calculate the evaluation value H, the control circuit 13 selects the optimum detection circuit according to the calculated evaluation value H in step S5. For instance, the control circuit 13 controls the selection circuit 10 and the switcher 5 to select a detection scheme having the largest evaluation value H, from among evaluation values H calculated by Equation 2 as shown in Table 6 below, according to the communication purpose requested by a user, so that a signal output from a signal judgment circuit connected a detection circuit corresponding to the selected detection scheme becomes an output signal of the receiver.

Also, for the purpose of saving power, the control circuit 13 cuts off power supply and/or clock supply for operating detection circuits and signal judgment circuits corresponding to all non-selected detection schemes in step S6, so that the operation of the detection circuits and the signal judgment circuits corresponding to the non-selected detection schemes is discontinued.

TABLE 6

| Communication purpose (application) | Level 'R' of Received signal | Detection scheme | | |
|---|---|---|---|---|
| | | Delay detection | Sub-synchronous detection | Dynamic controlled detection |
| Voice (Celp-system) | R < Rth | 10 | 0 | −8 |
| | R ≧ Rth | 8 | 2 | −8 |
| Text mail VoIP | R < Rth | 4 | 4 | 5 |
| Unspecified | R ≧ Rth | 4 | 6 | 5 |
| Moving picture | R < Rth | −3 | 0 | 10 |
| | R ≧ Rth | −3 | 1 | 12 |

Referring to Table 6, in the case of an application (e.g., a normal voice using a self-system codec for a cellular voice conversation, an electronic mail using text information, etc.) requiring relatively lower reception quality, the delay detection is selected as a detection scheme having a largest evaluation value H regardless of whether a reception level R is smaller than the reception-level threshold value Rth or a reception level R is equal to or larger than the reception-level threshold value Rth.

Meanwhile, in the case of an application (e.g., a voice conversation using VoIP, etc.) requiring a relatively higher reception quality, the dynamic controlled detection is selected as a detection scheme having a largest evaluation value H when a reception level R is smaller than the reception-level threshold value Rth, but the sub-synchronous detection is selected as a detection scheme having a largest evaluation value H when a reception level R is equal to or larger than the reception-level threshold value Rth.

When the delay detection is selected as a detection scheme having a largest evaluation value H, the control circuit 13 controls the delay detection circuit 2 and the judgment circuit 3 to operate and also controls the selection circuit 10 to select a signal output from the judgment circuit 3, so that the signal input from the judgment circuit 3 to the selection circuit 10 is output through the output terminal 11 as an output signal of the receiver. Also, in this case, the control circuit 13 cuts off power supply and/or clock supply for operating the sub-synchronous detection circuit 4, the signal judgment unit 6 and the differential decoder 7, so that the operations of the sub-synchronous detection circuit 4, the signal judgment unit 6 and the differential decoder 7 discontinue, thereby saving power.

When the sub-synchronous detection is selected as a detection scheme having a largest evaluation value. H, the control circuit 13 controls the sub-synchronous detection circuit 4, the signal judgment unit 6 and the differential decoder 7 and also controls the selection circuit 10 to select an output signal of the differential decoder 7, from among the judgment circuit 3, differential decoder 7 and data judgment unit 9 connected to the selection circuit 10, so that the signal input from the differential decoder 7 to the selection circuit 10 is output through the output terminal 11 as an output signal of the receiver. Also, in this case, the control circuit 13 cuts off power supply and/or clock supply for operating the delay detection circuit 2 and the judgment circuit 3 so as to save power, so that the operations of the delay detection circuit 2 and the judgment circuit 3 are discontinued.

When the dynamic controlled detection is selected as a detection scheme having a largest evaluation value H, the control circuit 13 performs a control operation as described below. The delay detection unit 8 and the data judgment unit 9 are supplied with power and/or clock for their operations only when the dynamic controlled detection is used.

The operation of the dynamic controlled detection performed by the control circuit 13 in the receiver according to an embodiment of the present invention will now be described.

First, the control circuit 13 receives output signals of the delay detection circuit 2 and the judgment circuit 3 at each change timing (i.e., at any time), and then selects and operates one detection circuit having the better reception characteristic of the delay detection circuit 2 and the sub-synchronous detection circuit 4. Also, the control circuit 13 controls the selection circuit 10 to select an output signal of one from among the judgment circuit 3, differential decoder 7 and data judgment unit 9 so that the selected output signal may be output through the output terminal 11 of the receiver.

In the following description, it is assumed that a modulation scheme is the differential encoding QPSK and a signal sampling period is a symbol period T of a modulation wave. Also, all signals are represents by complex numbers including a real number of an in-phase component and an imaginary number of an orthogonal component.

When the control circuit 13 previously selects and operates the delay detection circuit 2 and the judgment circuit 3 and controls the selection circuit 10 to select an output signal of the judgment circuit 3 and to output the selected output signal through the output terminal 11 of the receiver, the control circuit 13 calculates the amount of intersymbol interference included in the output signal of the delay detection circuit 2. Herein, the amount of intersymbol interference is a physical amount representing a degree of waveform distortion caused by intersymbol interference. When the amount of intersymbol interference is large, it can be determined that reception processing by the sub-synchronous detection circuit 4, the signal judgment unit 6 and the differential decoder 7 have better reception than by the delay detection circuit 2 and judgment circuit 3.

Therefore, when the amount of intersymbol interference exceeds a predetermined threshold value, the control circuit 13 performs a control operation to change into reception processing using the sub-synchronous detection circuit 4, the signal judgment unit 6 and the differential decoder 7 at the next burst timing. For instance, when the burst timing is set as the change timing, the control circuit 13 operates the sub-synchronous detection circuit 4, the signal judgment unit 6 and the differential decoder 7 and controls the selection circuit 10 to select an output signal of the differential decoder 7, so that the output signal of the differential decoder 7 is output through the output terminal 11 as an output signal of the receiver according to the embodiment.

Also, It is assumed that z(k) is a sampling value of the signal output from the delay detection circuit 2 at a time "t=kT (k is a positive integer)", d(k) is a phase difference between complex symbols at a time "t=kT" and a time "t=(k−1)T", and "z(k)d*(k)" and "d(k−1)" have correlation between each other when waveform distortion is caused by intersymbol interference. Herein, mark "*" represents a conjugate complex. Therefore, the amount of intersymbol interference can be calculated by the amount of correlation between "z(k)d*(k)" and "d(k−1)". For instance, when a predetermined signal period is a training signal period of signal length "$N_T$" with "d(k)" known in advance, the amount "ρ" of correlation is calculated as shown in Equation 3 below.

$$\rho = \sum_{k=2}^{N_T} z(k)d*(k)d*(k-1) \quad \text{Equation 3}$$

Meanwhile, in the case in which the control circuit 13 previously selects and operates the sub-synchronous detection circuit 4, the signal judgment unit 6 and the differential decoder 7 and controls the selection circuit 10 to select an output signal of the differential decoder 7 so that the output signal of the differential decoder 7 is output through the output terminal 11 as an output signal of the receiver, the control circuit 13 selects the output signal of one detection circuit having the better BER (Bit Error Rate) characteristic from among the output signals of the delay detection circuit 2 and the sub-synchronous detection circuit 4, according to a judgment formula obtained from a signal judgment error representing reception quality.

To be specific, an equal BER can be obtained from the delay detection scheme and the sub-synchronous detection scheme when output signals of the two detection schemes have either an equal S/N (Signal to Noise) rate or an equal signal energy to noise power density ($E_b/N_o$) per bit. Therefore, for instance, when a signal judgment error of an output signal of the delay detection circuit 2 is compared with a signal judgment error of an output signal of the sub-synchronous detection circuit 4, it is possible to select one detection circuit having the better BER characteristic from among the delay detection circuit 2 and the sub-synchronous detection circuit 4.

$$D = \sum_{k=2}^{N_T} |e_D(k)|^2 - \sum_{k=2}^{N_T} |e_E(k)|^2 \quad \text{Equation 4}$$

Herein, "$e_D(k)$" represents a signal judgment error of an output signal of the delay detection circuit 2 and "$e_E(k)$" represents a signal judgment error of an output signal of the sub-synchronous detection circuit 4. When the decision value "D" have a negative value, the control circuit 13 operates the delay detection circuit 2 and the judgment circuit 3 and controls the selection circuit 10 to select the output signal of the judgment circuit 3 in the next burst timing so that the output signal of the judgment circuit 3 is output through the output terminal 11 as an output signal of the receiver. When "D" has a positive value, the control circuit 13 operates the sub-synchronous detection circuit 4, the signal judgment unit 6 and the differential decoder 7, and controls the selection circuit 10 to select the output signal of the differential decoder 7 in the next burst timing, so that the output signal of the differential decoder 7 is output through the output terminal 11 as an output signal of the receiver.

Meanwhile, in a state in which the control circuit 13 previously selects and operates the sub-synchronous detection circuit 4, the signal judgment unit 6 and the differential decoder 7, and the selection circuit 10 selects the output signal of the differential decoder 7 to be output through the output terminal 11 as an output signal of the receiver, the control circuit 13 may change the current detection scheme into the delay detection scheme depending on a decision value D. In this case, the control circuit 13 first may operate the delay detection unit 8 and the data judgment unit 9, control the selection circuit 10 to select the output signal of the data judgment unit 9, and output the selected output signal through the output terminal 11 as an output signal of the receiver. Then, in the next burst timing, the control circuit 13 operates the delay detection circuit 2 and the judgment circuit 3 and controls the selection circuit 10 to select the output signal of the judgment circuit 3 in the next burst timing, so that the output signal of the judgment circuit 3 is output through the output terminal 11 of the selection circuit 10 as an output signal of the receiver.

For instance, in a mobile wireless communication scheme, the delay distribution of a transmission channel largely varies owing to the movement of a mobile station apparatus, thereby changing the reception state of a received signal every moment. However, when the dynamic controlled detection described above is used to control the detection scheme of the receiver, the reception state of a received signal is continuously monitored, and the received signal can be processed in optimum detection scheme which continuously-changes according to the reception state of the received signal, so that the power consumption of the mobile station can be reduced as much as possible while a reception quality higher than a predetermined level is being maintained, even in the case of using an application requiring a remarkably high reception quality (e.g., a moving picture, etc.).

Meanwhile, when the control circuit 13 calculates an evaluation value H relating to a communication purpose, a reception state of a received signal and a detection scheme, the fixed profile shown in Table 3 may be used as an index of reception states. The fixed profile is set according to a case of "reception level R<reception-level threshold value Rth" and a case of "reception level R≧reception-level threshold value Rth" on the basis of the reception level R of a received signal and the reception-level threshold value Rth which is a comparison object of the reception level. Meanwhile, the evaluation values H shown in Table 6 are calculated according to the reception level R of a received signal and the reception-level threshold value Rth which is a comparison object of the reception level. However, as shown in Table 7 below, it is possible to set a fixed profile according to a case of "delay time period T<delay-time threshold value Tth" and a case of "delay time period T≧delay-time threshold value Tth" by using a delay time period T of a received signal and a delay-time threshold value Tth which is a comparison object of the delay time period as factors, and to calculate evaluation values 'H' according to a delay time period T of a received signal and a delay-time threshold value Tth which is a comparison object of the delay time period.

Also, the delay time period T of a received signal may be calculated using a reception time period of a training signal having previously-known signal length $N_T$. In this case, therefore, the receiver according to the present invention need not include the reception-level detection unit 12.

TABLE 7

| Communication purpose (application) | Delay time period 'T' of received signal | Detection scheme | | |
|---|---|---|---|---|
| | | Delay detection | Sub-synchronous detection | Dynamic controlled detection |
| Voice (Self-system) | T < Tth | 10 | 0 | −8 |
| Text mail | T ≧ Tth | 8 | 2 | −8 |
| VoIP | T < Tth | 4 | 4 | 5 |
| Unspecified | T ≧ Tth | 4 | 6 | 5 |
| Moving picture | T < Tth | −3 | 0 | 10 |
| | T ≧ Tth | −3 | 1 | 12 |

Figure 2:
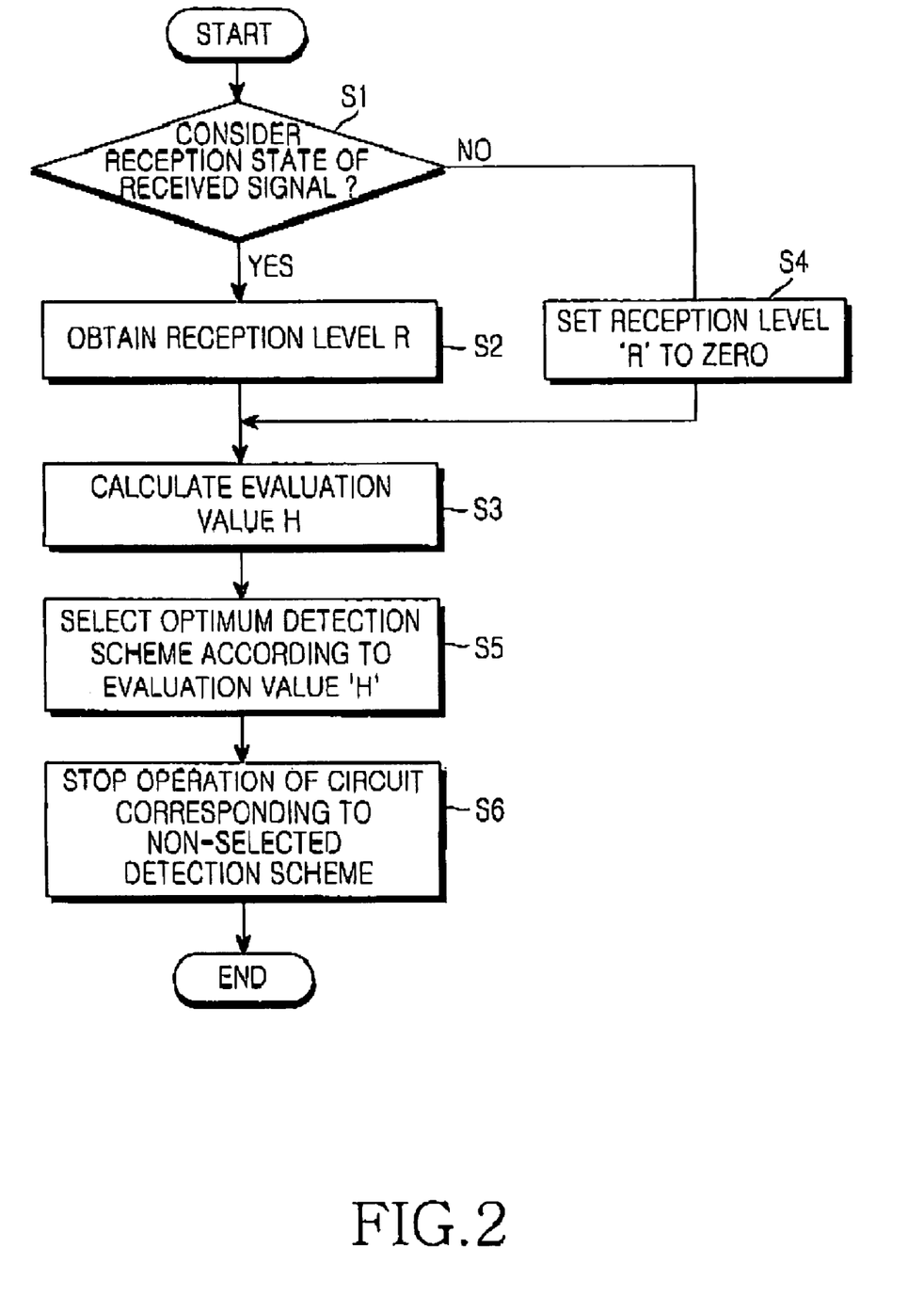
FIG. 2 is a flowchart illustrating the control operation of the control circuit in the receiver according to the first embodiment of the present invention.

As described above, it is not necessary that the operation for selecting a detection scheme according to the user's communication purpose as described in steps S1 to S6 in FIG. 2 is executed in real time. Particularly, when a desired communication is finished in a short time, it is enough to determine a detection scheme before the desired communication starts. Therefore, it is also not necessary that judgment of a reception state performed by the reception-level detection unit 12, is executed in real time, and it is enough to execute the judgment of a reception state only once before or when a desired communication starts. Therefore, it is possible to reduce the power consumption and the required processing capability of circuits in the apparatus.

Herein, "desired communication" indicates communication according to applications as represented as the user's communication purpose in Tables 3 to 7 above. It is assumed that communication relating to the transmission/reception of a control signal which is performed to maintain a bi-directional transmittable state between a transmitter and a receiver is performed continuously or at predetermined interval(s) if the transmitter and the receiver are supplied with power. Therefore, in the case in which the receiver according to the present invention performs judgment of a reception state by the reception-level detection unit 12 before or when a desired communication starts, the receiver can judge a reception state using a control signal output from the transmitter.

However, when a desired communication is not finished in a short time, the optimum detection scheme (detection circuit) can be selected by executing the operation according to steps S1 to S6 shown in FIG. 2 at a predetermined interval and by periodically executing revaluation of a reception state, because a reception state of a mobile station apparatus does not largely change although the apparatus moves together with a user thereof in a mobile wireless communication scheme.

As described above, since the receiver of the present invention performs judgment of a reception state of a received signal intermittently at a predetermined interval during a communication interval, not only is the processing burden required to judge a reception state of a received signal reduced, but also it is possible that the judgment of a reception state is executed with an actually received signal and simultaneously the optimum evaluation value H according to the judged reception state can be calculated. Particularly, the receiver of the present invention judges a reception state using an actually received signal, it is possible to maintain the exact balance between the power consumption and the reception performance, and also it is possible to certainly achieve both reception performance according to the user's communication purpose and prevention of unnecessary power consumption. In addition, since the processing burden in the receiver of the present invention is reduced, unnecessary power consumption can be prevented.

Meanwhile, the control circuit 13 includes an evaluation value calculation means and a judgment means. To be specific, the control circuit 13 includes the evaluation value calculation means for calculating an evaluation value H in step S3 described with reference to FIG. 2 and the judgment means for selecting the optimum detection scheme in step S5 described with reference to FIG. 2 according to the calculated evaluation value H.

As described above, the receiver of the present invention calculates an evaluation value H relating to a communication purpose, a reception state of a received signal and a detection scheme on the basis of a control table prestored in the control circuit 13, and selects a detection scheme according to the calculated evaluation value H. Then, the receiver operates a detection circuit corresponding to the selected detection scheme, so that the receiver can receive a signal in a processing scheme keeping the balance between the user's communication purpose and the reception state of a received signal.

Since the receiver can receive a signal in a processing scheme keeping the balance between the user's communication purpose and the reception state of a received signal, it is possible to maintain the balance between the power consumption and the reception performance, and it is possible to achieve both reception performance according to the user's communication purpose and prevention of unnecessary power consumption.

Also, when a desired communication is finished in a short time, the reception-level detection unit 12 executes the judgment of a reception state only once before or when the desired communication starts, and the operation of selecting a detection scheme according to the user's communication purpose is finished before the desired communication starts at the latest, so that it is possible to reduce the power consumption and the processing capability required to circuits in the receiver.

Meanwhile, the reception-level detection unit 12 executes the judgment of a reception state at regular intervals, the operation of selecting a detection scheme according to the user's communication purpose is executed, and then the optimum detection scheme (detection circuit) corresponding to the judged reception state is selected. Therefore, the receiver of the present invention can reduce the processing burden required to judge a reception state of a received signal, and performs the judgment of a reception state with an actually received signal, thereby maintaining the exact balance between the power consumption and the reception performance and certainly achieving both reception performance according to the user's communication purpose and prevention of unnecessary power consumption. In addition, since the processing burden in the receiver is reduced, unnecessary power consumption can be prevented.

In addition, according to the receiver of the present invention, when an evaluation value H is calculated, conditions requested by a user are considered in selecting a detection scheme, and the request conditions and the intention of a user are numeralized (i.e., numerically converted) by the user request profile correction values and the user setup request scale factors to be considered in calculating the evaluation value H. Therefore, it is possible to maintain the optimum balance between the power consumption and the reception performance according to the request conditions and the intention of a user, so that it is possible to certainly achieve not only the reception performance according to the user's communication purpose and request conditions but also the prevention of unnecessary power consumption.

Hereinafter, the operation of a receiver according to a second embodiment of the present invention will be described. To this end, the construction of the receiver according to the second embodiment of the present invention will be described with reference to FIG. 3, which illustrates a block diagram showing the construction of the receiver according to the second embodiment of the present invention.

In the second embodiment of the present invention, it is assumed that a signal having undergone a spread spectrum transmission is input to the receiver according to the present invention. Also, it is assumed that a receiving party already knows a spread code which is used to execute the spread spectrum by the transmitting party. In addition, it is assumed that the transmitting party synchronizes transmission/reception timing of a signal between a transmitter and the receiver, a synchronizing signal for the receiver to find a head signal of a reception signal has been transmitted, and that a receiving party already knows the synchronizing signal.

Figure 3:
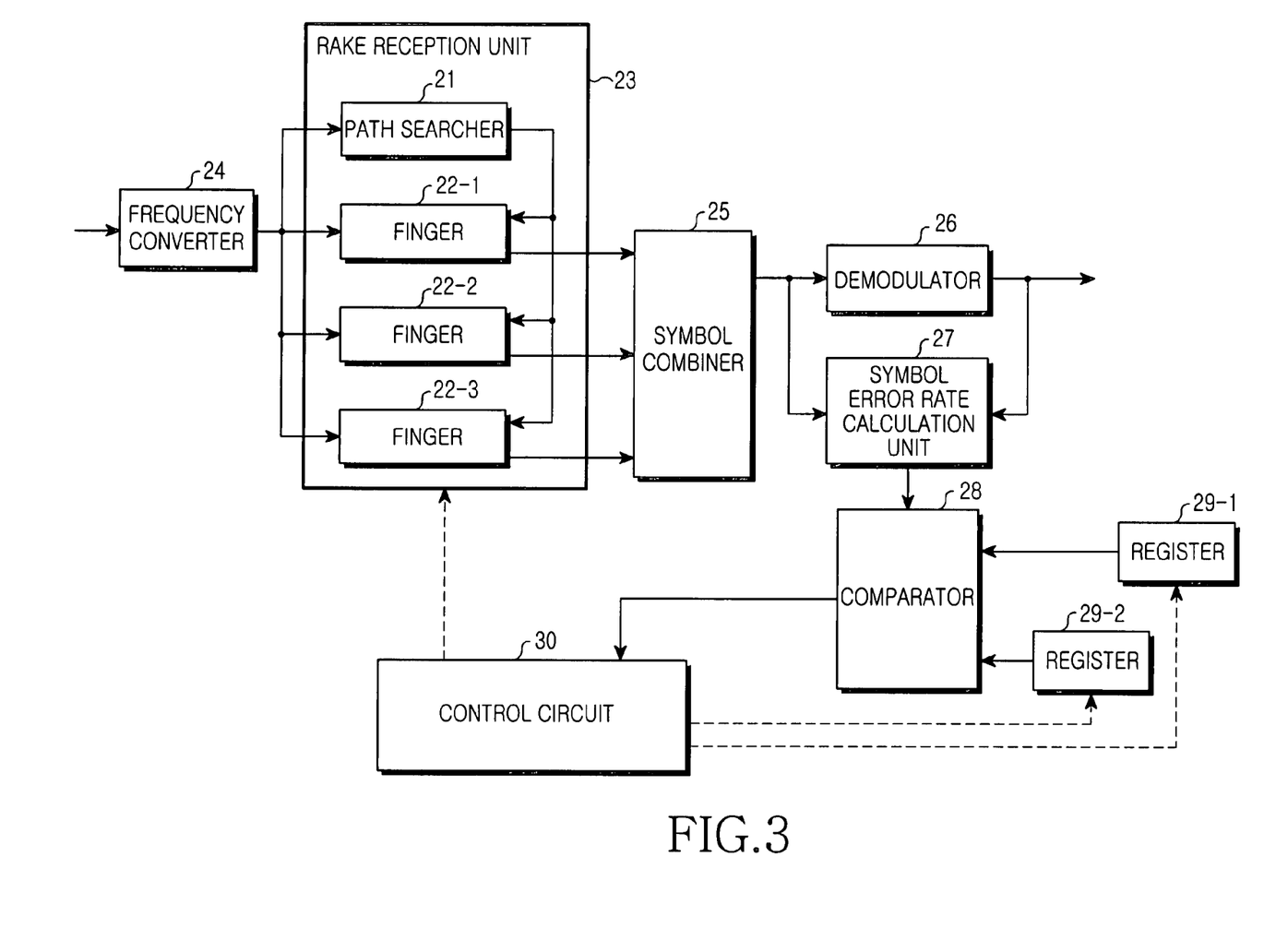
FIG. 3 is a block diagram illustrating the construction of the receiver according to a second embodiment of the present invention.

Referring to FIG. 3, the receiver includes a RAKE reception unit 23 which contains a path searcher 21 and a plurality of fingers 22-1 to 22-3. For convenience of description, fingers contained in the RAKE reception unit 23 are limited to the three fingers 22-1 to 22-3, but the number of fingers may change according to necessity.

A received signal having been converted into a baseband signal by a frequency converter 24 is input to the path searcher 21, the path searcher 21 extracts a reception timing of a multipath signal from the received signal. To be more specific, for example, the path searcher 21 includes a sliding correlator, which calculates a correlation value between a received signal and a replica of a synchronizing signal transmitted from a base station by offsetting the timing of the received signal, and a timing increasing the correlation value is set as a reception timing of a multipath signal included in the received signal.

That is, the path searcher 21 selects and outputs timings of the fingers 22-1 to 22-3 in order of larger-to-smaller correlation value, from among timings from which correlation values larger than a predetermined threshold value are calculated. In this case, the respective timing outputs of the path searcher 21 are set at the fingers 22-1 to 22-3 in sequence, respectively. Also, when the number of timing outputs from the path searcher 21, from which correlation values larger than the predetermined threshold value are calculated, is smaller than the number of fingers 22-1 to 22-3 included in the RAKE reception unit 23, a control circuit 30 described later cuts off power supply and/or clock supply for operating fingers to which a reception timing is not set, thereby stopping the operation of the relevant fingers for the purpose of saving power and preventing the relevant fingers from affecting the reception processing.

Meanwhile, each of the fingers 22-1 to 22-3 includes a despreader having equal construction to the fingers. Each of the fingers 22-1 to 22-3 calculates a correlation value between a received signal input thereto and a spread code by multiplying the received signal input thereto by a spread code according a reception timing set by the path searcher 21, and calculates correlation values between the received signal and the spread code while it proceeds to cause the timing of the spread code and the received signal to be discordant by sequential symbol periods, so that spread spectrum having been applied to the received signal is demodulated and the received signal is converted into a symbol signal.

Therefore, when the received signal input thereto is a multipath signal, a signal having multiple paths, which constitutes the multipath signal, is divided and extracted as signals of the respective paths by the respective fingers which perform demodulation processing with a reception timing of a signal of each path. Also, when the number of fingers is three as in this embodiment, it is possible to extract a three-wave signal input through the multiple paths.

Also, symbol signals output from the fingers 22-1 to 22-3 are combined with to each other in a symbol combiner 25 in consideration of reception timing distortion of the received signal, so that a multipath signal is RAKE-combined.

Then, an output signal of the symbol combiner 25 is input to a demodulator 26, in which a primary modulation portion (e.g., QPSK, etc.) applied to the output signal in the transmitting party is demodulated, and simultaneously error correction of the output signal is performed by decoding a convolutional coding applied in the transmitting party, etc., thereby converting the output signal of the symbol combiner 25 into reception data.

Meanwhile, a symbol error rate calculation unit 27 performs convolutional coding, which has been performed in the transmitting party, with respect to the reception data, compares a hard decision value of a symbol signal output from the symbol combiner 25 and the reception data having again undergone the convolutional coding, and then calculates a degree of error by which the both are discordant, that is, a symbol error rate (SER).

The symbol error rate (SER) calculated in the symbol error rate calculation unit 27 is compared with each of the values R1 and R2 (R1>R2) of registers 29-1 and 29-2 in a comparator 28, so that one of the comparison results (i.e., 'SER>R1>R2', 'R1>SER>R2'and 'R1>R2>SER') is output from the comparator 28 and input to the control circuit 30.

Herein, the number of registers must be one less than the number of fingers contained in the RAKE reception unit 23. For example, when the number of fingers is three as described in this embodiment, the number of registers must be two. Therefore, when N (where N is a positive integer) number of fingers is contained in the RAKE reception unit 23, a symbol error rate calculated in the symbol error rate calculation unit 27 is compared with each of N−1 number of register values in the comparator 28, so that one of N kinds of comparison results is output from the comparator 28 and input to the control circuit 30.

Also, the control circuit 30 controls the operation of the RAKE reception unit 23. That is, the control circuit 30 controls the number of fingers to be employed for RAKE combination in the RAKE reception unit 23, according to a comparison result of the symbol error rate (SER) output from the comparator 28 and the register values. To be specific, when a comparison result output from the comparator 28 is SER>R1>R2, it indicates the reception state is bad, so that the control circuit 30 responds appropriately so that three fingers are employed for RAKE combination in the RAKE reception unit 23. When a comparison result output from the comparator 28 is R1>SER>R2, the control circuit 30 controls that two fingers are employed for RAKE combination in the RAKE reception unit 23. When a comparison result output from the comparator 28 is R1>R2>SER, it indicates the reception state is good, so that the control circuit 30 responds appropriately so that one finger is employed for RAKE combination in the RAKE reception unit 23.

Also, in order to select the optimum number of fingers corresponding to the user's communication purpose, the control circuit 30 calculates an evaluation value 'H' relating to the user's communication purpose and changes the values R1' and 'R2 of registers 29-1 and 29-2 depending on the calculated evaluation value H. Also, similar to the first embodiment of the present invention, the control circuit 30 includes an evaluation value calculation means and a judgment means. The evaluation value calculation means calculates an evaluation value H according to the user's communication purpose, and the judgment means changes the reception values R1 and R2 of registers 29-1 and 29-2 so as to select a processing scheme of a signal processing means (i.e., selecting the number of fingers to be employed for RAKE combination in the RAKE reception unit 23) depending on the calculated evaluation value H.

Hereinafter, the control operation for selecting the optimum number of fingers in the control circuit 30 of the receiver according to the second embodiment of the present invention will be discussed.

The control circuit 30 calculates an evaluation value H relating to a communication purpose on the basis of a control table prestored in the control circuit 30. The control table prestored in the control circuit 30 in order to calculate an evaluation value H relating to a communication purpose, a reception state of a received signal and a detection scheme will now be described. Table 8 illustrates a fixed profile set according to users' communication purposes. In Table 8, a larger number represents that a higher reception quality is required.

TABLE 8

| Communication purpose (application) | Estimation value |
| --- | --- |
| Text mail | −2 |
| Voice (Self-system) | −1 |
| Unspecified | 0 |
| Voice (high bit rate) | 1 |
| VoIP, Moving picture | 2 |

Herein, the communication purposes of users may be classified into, for instance applications e.g., a first application such as an electronic mail using text information, etc. requiring little reception quality, a second application (e.g., a normal voice using a self-system codec for a cellular communication, etc.) requiring relatively lower reception quality, a third application (such as, a high-quality voice communication having a higher bit rate that that of a normal voice, etc.) requiring a little high reception quality, and a fourth application such as, a voice using VoIP, a moving picture, etc.) requiring relatively higher or very high reception quality. In cases where the communication purpose of a user is unspecified, this would be regarded as an intermediate case between the second application and the third application.

Table 9 below shows user request profile correction values which are set in consideration of user request conditions for each user communication purpose in order to compensate for the fixed profile which is set every user communication purpose. To be specific, "extension of battery lifetime" and "improvement of reception quality" are examples of user request conditions in Table 9. In the following description, tables and drawings, are similar to the first embodiment of the present invention, and "extension of battery lifetime" and "improvement of reception quality" will be abbreviated to "battery lifetime" and "reception quality", respectively. In Table 9, the larger number indicates the more fingers required for a user request.

Referring to Table 9, in the case of an application (e.g., an electronic mail using text information, etc.) requiring little reception quality, it is preferred to reduce the number of fingers when battery lifetime has priority, so that the user request profile correction value is assigned as −1. Also, in this case, when the reception quality has priority, the user request profile correction value is assigned as 0 because it is undesirable for the number of fingers to be excessively increased.

Also, in the case of an application (e.g., a voice using VoIP, a moving picture, etc.) requiring relatively higher or very high reception quality, it is preferred to reduce the number of fingers when the battery lifetime has a priority, thereby determining the user request profile correction value to be −1. Also, in this case, when the reception quality has a priority, the user request profile correction value is assigned as 2 because it is necessary to increase the number of fingers to as many as possible.

TABLE 9

| Communication purpose (application) | Condition requested by user | User setup request scale factor |
| --- | --- | --- |
| Text mail | battery lifetime | −1 |
|  | reception quality | 0 |
| Voice (Self-system) | battery lifetime | −1 |
|  | reception quality | 0 |
| Unspecified | battery lifetime | −1 |
|  | reception quality | 1 |

TABLE 9-continued

| Communication purpose (application) | Condition requested by user | User setup request scale factor |
|---|---|---|
| Voice (high bit rate) | battery lifetime | −1 |
|  | reception quality | 1 |
| VoIP, | battery lifetime | −1 |
| Moving picture | reception quality | 2 |

Table 10 below shows user setup request scale factors determined according to a user's preference with respect to the user request profile correction values set as shown in Table 9. As shown in Table 10, a user can selectively determine user setup request scale factors, for example, using values from 0 to 2, with respect to the respective user request profile correction values for every combination of the user communication purposes and request conditions. Referring to Table 10, in the application (e.g., an electronic mail using text information, etc.) requiring little reception quality, the battery lifetime must take precedence to the reception quality, so the user setup request scale factor of the battery lifetime is assigned as 2 by a user.

TABLE 10

| Communication purpose (application) | Condition requested by user | User setup request scale factor |
|---|---|---|
| Text mail | battery lifetime | 2 |
|  | reception quality | 0 |
| Voice (Self-system) | battery lifetime | 1 |
|  | reception quality | 0 |
| Unspecified | battery lifetime | 0 |
|  | reception quality | 1 |
| Voice (high bit rate) | battery lifetime | 1 |
|  | reception quality | 2 |
| VoIP, | battery lifetime | 0 |
| Moving picture | reception quality | 2 |

Therefore, estimation values H, which relate to user's communication purposes, as many as the communication purposes are obtained through Equation 5, on the basis of control tables which are pre-stored in the control circuit 30 as shown in Tables 8 through 10.

$$H = P + \sum_{n=1}^{J} Q(n) \times R(n)$$ Equation 5

Herein, P represents a fixed profile, Q(n) represents a user request profile correction value set by n kinds (n is a positive integer), R(n) represents a user setup request scale factor corresponding to user request profile correction values of n kinds, and J represents the total number of the user request profile correction values. According to the second embodiment of the present invention, since there are two kinds of user request profile correction values with respect to the battery lifetime (n=1) and the reception quality (n=2), the total number J of user request profile correction values becomes '2'. For instance, in the case of an application (e.g., an electronic mail using text information, etc.) requiring little reception quality, a fixed profile is 'P=−2', user request profiles are 'Q(1)=−1' and 'Q(2)=0', user setup request scale factors are 'R(1)=2' and 'R(2)=0', so that a final estimation value 'H' is calculated as shown in Equation 6.

$$H = P + \sum_{n=1}^{2} Q(n) \times R(n)$$ Equation 6

$$= (-2) + (-1) \times 2 + 0 \times 0$$

$$= -4$$

Meanwhile, when the control circuit 30 calculates an evaluation value H, the control circuit 30 calculates register compensation values RH for changing the values R1 and R2 of the registers 29-1 and 29-2 using the calculated evaluation value H.

$$RH = 10^{((1-H)/2)}$$ Equation 7

To be specific, using evaluation values 'H' calculated by Equation 5 which are shown in Table 11 below, register compensation value RH are calculated by Equation 7 which are also shown in Table 11 below. Then, the values R1 and R2 of the registers 29-1 and 29-2 change through Equations 8 and 9 below. In Equations 8 and 9, an initial value of a register is properly determined in consideration of synthetic reception performance when the receiver is designed.

$$R1 = (\text{initial value of register}) \times RH$$ Equation 8

$$R2 = (\text{initial value of register}) \times RH$$ Equation 9

The control circuit 30 controls the number of fingers to be employed for RAKE combination in the RAKE reception unit 23, according to comparison results of a symbol error rate (SER) output from the comparator 28 and the values 'R1' and 'R2' of the registers 29-1 and 29-2 which are controlled to select the optimum number of fingers depending on a user communication purpose.

Also, the control circuit 30 cuts off power supply and/or clock supply for operating fingers which are employed for RAKE combination, thereby stopping the operation of the relevant fingers to save power and preventing the relevant fingers from affecting the reception processing.

TABLE 11

| Communication purpose (application) | Evaluation value | Compensation value of Register |
|---|---|---|
| Text mail | −4 | 316.227766 |
| Voice (Self-system) | −2 | 31.6227766 |
| Unspecified | 1 | 1 |
| Voice (high bit rate) | 2 | 0.316227766 |
| VoIP, Moving picture | 6 | 0.00316227766 |

Referring to Table 11, for instance, in the case of an application (e.g., an electronic mail using text information, etc.) requiring little reception quality, since the compensation value of a register is calculated as 'RH=316', the values 'R1' and 'R2' of the registers 29-1 and 29-2 become large. Also, a comparison result in the comparator 28 is likely to be R1>R2>SER although the symbol error rate (SER) has deteriorated a little. Therefore, the number of fingers employed for RAKE combination in the RAKE reception unit 23 becomes one, and it is possible to achieve both reception performance according to the user's communication purpose and accordingly prevent unnecessary power consumption.

Meanwhile, in the case of an application (e.g., a voice using VoIP, a moving picture, etc.) requiring relatively higher or very high reception quality, since the compensation value of a register is calculated as 'RH=0.00316', the values 'R1' and 'R2' of the registers 29-1 and 29-2 become small. Also, a comparison result in the comparator 28 is likely to be 'SER>R1>R2' although the symbol error rate (SER) is somewhat good. Therefore, the number of fingers employed for RAKE combination in the RAKE reception unit 23 is three, and the reception performance according to the user's communication purpose can be achieved although power consumption increases.

As described above, according to the receiver of the present invention, the control circuit 30 calculates an evaluation value H relating to a communication purpose depending on a control table prestored in the control circuit 30, selects the number of fingers to be employed for RAKE reception according to the calculated evaluation value H, and operates the fingers corresponding to the selected number, thereby RAKE receiving a signal by fingers of the number corresponding to the user's communication purposes.

Therefore, since fingers of the number corresponding to the user's communication purposes, it is possible to maintain the balance between the power consumption and the reception performance, and also it is possible to achieve both reception performance according to the user's communication purpose and the prevention of unnecessary power consumption.

In addition, when an evaluation value H is calculated, conditions requested by a user are considered in selecting a detection scheme, and the request conditions and the intention of the user are numeralized (i.e., numerically converted) by the user request profile correction values and the user setup request scale factors to be considered in calculating the evaluation value H. Therefore, it is possible to maintain the optimum balance between the power consumption and the reception performance according to the request conditions and the intention of a user, and it is possible to certainly achieve not only the reception performance according to the user's communication purpose and conditions but also the prevention of unnecessary power consumption.

The scope of the invention is not to be limited by the above embodiments, but it is possible to improve the performance of the receiver by increasing the number of selectable detection schemes in the detector of the receiver, thereby achieving both the reception performance and the optimum power consumption corresponding to a user's request, preventing the consumption of more power than is necessary, and maintaining requested performance.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiver for demodulating a received signal, the receiver comprising:

a signal processing unit for processing the received signal by one of multiple processing schemes;

an evaluation value calculation unit for calculating an evaluation value by adaptively assigning different weights to a reception level of the received signal and a battery life of the receiver according to a type of communication of the received signal, wherein the type of communication includes at least one of text and voice communication; and a judgment unit for selecting a processing scheme to be used by the signal processing unit dependent upon the calculated evaluation value.

2. The receiver as claimed in claim 1, further comprising a reception state judgment unit for determining the reception level of the received signal.

3. The receiver as claimed in claim 2, wherein the reception state judgment unit intermittently determines the reception level of the received signal at a predetermined interval during a communication interval.

4. The receiver as claimed in claim 3, wherein the evaluation value calculation unit assigns a weight to the evaluation value using a compensation value obtained according to conditions requested by a user.

5. The receiver as claimed in claim 4, wherein the compensation value is set according to the type of communication.

6. The receiver as claimed in claim 2, wherein the evaluation value calculation unit assigns a weight to the evaluation value using a compensation value obtained according to conditions requested by a user.

7. The receiver as claimed in claim 6, wherein the compensation value is set according to the type of communication.

8. The receiver as claimed in claim 2, wherein the reception state judgment unit determines the reception level before the start of a desired communication.

9. The receiver as claimed in claim 2, wherein the reception state judgment unit determines the reception level during a desired communication.

10. The receiver as claimed in claim 1, wherein the signal processing unit comprises a RAKE receiver for receiving a spread spectrum signal, and the judgment unit selects a number of fingers of the RAKE receiver.

11. The receiver as claimed in claim 10, wherein the evaluation value calculation unit assigns a weight to the evaluation value using a compensation value obtained according to conditions requested by a user.

12. The receiver as claimed in claim 11, wherein the compensation value is set according to the type of communication.

13. The receiver as claimed in claim 1, wherein the evaluation value calculation unit assigns a weight to the evaluation value using a compensation value obtained according to conditions requested by a user.

14. The receiver as claimed in claim 13, wherein the compensation value is set according to the type of communication.

* * * * *